(No Model.)

G. F. BUTTERFIELD.
BOOT OR SHOE SOLE AND HEEL.

No. 326,476. Patented Sept. 15, 1885.

WITNESSES:
Chas. S. Gooding
W H Noonan

INVENTOR:
Geo. F. Butterfield
by A. H. Spencer
Attorney.

UNITED STATES PATENT OFFICE.

GEORGE F. BUTTERFIELD, OF STONEHAM, MASSACHUSETTS.

BOOT OR SHOE SOLE AND HEEL.

SPECIFICATION forming part of Letters Patent No. 326,476, dated September 15, 1885.

Application filed January 30, 1885. (No model.)

*To all whom it may concern:*

Be it known that I, GEORGE F. BUTTERFIELD, a citizen of the United States, residing at Stoneham, in the county of Middlesex and State of Massachusetts, have invented certain new and useful Improvements in Boot or Shoe Soles and Heels; and I do hereby declare that the same are fully described in the following specification, and illustrated in the accompanying drawings.

The object of this invention is to provide for greater warmth in the soles of boots or shoes—that is, to furnish such articles with soles of non-conducting character, so that in the most severe weather the bottoms of the wearer's feet shall not be chilled by the external cold entering by conduction through the soles. This result I accomplish by interposing a layer of fibrous asbestus between the foot and the bottom part of the shoe-sole, by preference locating this layer within the sole proper, and at or near its upper surface, so as to leave a thick wearing body outside thereof. The asbestus may be mixed with other fibrous non-conducting material to increase its bulk, and may take the form and place of an insole. I design, however, to usually form the outer soles of boots or shoes of rubber, with the asbestus inclosed.

Figure 1:
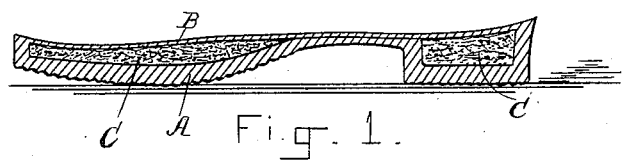
Figure 2:
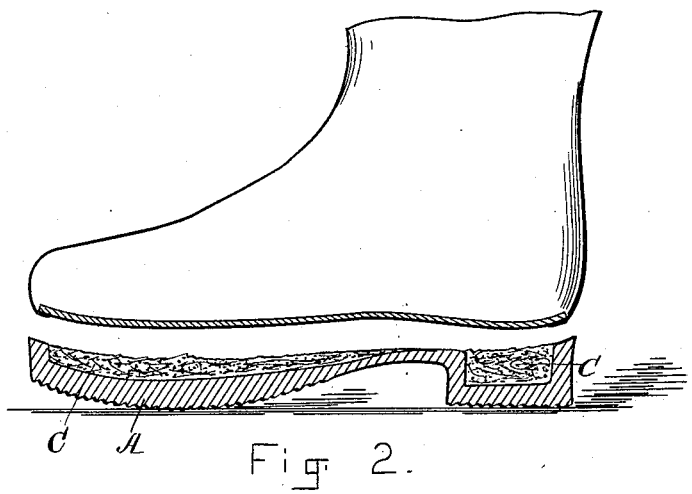

The drawings represent, in Figure 1, a sole and heel having within them a suitable thickness of asbestus, and with a tread-surface and upper web of rubber or leather of proper proportions, while Fig. 2 represents the asbestus as forming the upper surface of the sole and coming next to the insole.

A is the bottom part of the sole and heel, and B the upper part, suitably secured thereto. C is a layer of asbestus, or of an admixture thereof with other fibrous non-conducting material to increase its cohesion and its bulk.

The parts A and B will ordinarily be of vulcanized rubber cured in molds of proper form, with the asbestus filling inclosed. The parts A may be shaped to receive the filling by the use of a machine having a plain and an engraved roller, between which a mass of vulcanizable rubber compound may be passed, forming a continuous sheet having a succession of sole-shaped protuberances on the upper side, each with a depression or recess in it of suitable proportions for the asbestus filling. These protuberances are then cut out of the sheet, the pieces of asbestus placed in the depressions, and a plain, thin, sole-shaped layer of rubber compound placed over all. The whole is then placed in a suitable mold and the rubber vulcanized.

I claim as my invention—

A sole or heel for boots or shoes having a rubber body and a non-conducting layer of asbestus upon its inner surface, substantially as set forth.

In testimony whereof I hereto affix my signature in presence of two witnesses.

GEORGE F. BUTTERFIELD.

Witnesses:
A. H. SPENCER,
E. A. PHELPS.